United States Patent
Nakhla et al.

(10) Patent No.: US 7,326,343 B2
(45) Date of Patent: Feb. 5, 2008

(54) TREATMENT OF WASTEWATER CONTAINING PHOSPHOROUS AND NITROGEN

(75) Inventors: George Nakhla, Woodbridge (CA); Jigneshkumar Patel, London (CA)

(73) Assignee: University of Western Ontario Canada, London (CA)

( * ) Notice: Subject to any disclaimer, the term of this patent is extended or adjusted under 35 U.S.C. 154(b) by 209 days.

(21) Appl. No.: 11/119,929

(22) Filed: May 3, 2005

(65) Prior Publication Data

US 2006/0249449 A1 Nov. 9, 2006

(51) Int. Cl.
C02F 3/30 (2006.01)
C02F 3/34 (2006.01)

(52) U.S. Cl. ............ 210/605; 210/623; 210/903; 210/906

(58) Field of Classification Search ........ 210/603, 210/605, 615–617, 621–623, 630, 903, 906, 210/908
See application file for complete search history.

(56) References Cited

U.S. PATENT DOCUMENTS

| | | | | |
|---|---|---|---|---|
| 4,173,531 | A | * | 11/1979 | Matsch et al. ............ 210/624 |
| 5,281,335 | A | * | 1/1994 | Kuhn .................... 210/605 |
| 5,480,548 | A | * | 1/1996 | Daigger et al. ........... 210/605 |
| 5,798,043 | A | * | 8/1998 | Khudenko ............... 210/603 |
| 5,833,856 | A | * | 11/1998 | Liu et al. ................ 210/605 |
| 5,853,588 | A | * | 12/1998 | Molof et al. ............. 210/605 |
| 6,113,786 | A | * | 9/2000 | Burke ................... 210/603 |
| 6,485,645 | B1 | | 11/2002 | Husain et al. |
| 2003/0217968 | A1* | | 11/2003 | Goel et al. .............. 210/605 |
| 2004/0178132 | A1* | | 9/2004 | Nakhla et al. ........... 210/605 |
| 2005/0087480 | A1* | | 4/2005 | Park et al. .............. 210/96.1 |

FOREIGN PATENT DOCUMENTS

| | | | |
|---|---|---|---|
| KR | 2001-084760 | * | 9/2001 |
| KR | 2001084760 | * | 9/2001 |
| KR | 2004-094019 | * | 11/2004 |

OTHER PUBLICATIONS

Ahn K-H, Song K-G, Cho E., Cho J., Yun H., Lee S. and Kim J. (2003), Enhanced biological phosphorus and nitrogen removal using a sequencing anoxic/anaerobic membrane bioreactor (SAM) process, Desalination, 157, 345-352.

(Continued)

Primary Examiner—Fred G. Prince
(74) Attorney, Agent, or Firm—Standley Law Group LLP

(57) ABSTRACT

A method and process for the treatment of wastewater containing phosphorous and nitrogen. The wastewater is first anaerobically treated to produce an anaerobic effluent from which insoluble organic carbon is separated to form a sludge rich in organic carbon that is used as a substrate during anoxic treatment of the wastewater by de-nitrifying phosphorous accumulating organisms (DPAO's) and ordinary de-nitrifying organisms. The separation of insoluble organic carbon is normally conducted using a clarifier located intermediate the anaerobic and anoxic bio-reactors. In one embodiment, the ammonia rich clarifier supernatant is directed to an aerobic reactor for nitrification and the nitrate produced is recycled to the anoxic bio-reactor. The final effluent may be membrane filtered to retain nitrifying biomass within the aerobic bio-reactor. The invention reduces overall hydraulic residence time and sludge volume, which results in a smaller, less expensive wastewater treatment system.

18 Claims, 9 Drawing Sheets

OTHER PUBLICATIONS

Bortone G., Saltarelli R., Alonso V., Sorm R., Wanner J. and Tilche A. (1996), Biological anoxic phosphorus removal—The DEPHANOX process, Water Sci. Technol., 34 (1-2), 119-128.

Cicek N., Fanco J. P., Suidan M. T. and Vincent Urbain (1999), Effect of phosphorus on operation and characteristics of MBR, J. Environ. Eng., 125 (8), 738-746.

Cicek N., Winnen H., Suidan M. T., Wrenn B. E., Urbain V. and Manem J. (1998), Effectiveness of the membrane bioreactor in the biodegradation of high molecular weight compounds, Water Res., 32 (5).

Fan Xiao-Jun, Urbain V., Qian Yi and Manem J. (1996), Nitrification and mass balance with a membrane bioreactor for municipal wastewater treatment, Water Sci. Technol., 34 (1-2), 129-136.

Falkentoft, C.M., Harremoës, P., Mosbæk, H. (1999), The significance of zonation in a denitrifying, phosphorus removing biofilm, Water Res., 33 (15), 3303-3310.

Henze, M., Gujer, W., Mino, T., Matsuo, T., Wentzel, M.C., Marais, Gv.R. (1995). The activated sludge model No. 2, IAWQ Scientific and Technical Report No. 3., International Association on water pollution research and control, London.

Innocenti L., Bolzonella D., Pavan P. and Cecchi F. (2002), Effect of sludge age on the performance of a membrane bioreactor: influence on nutrient and metals removal, Desalination, 146 (1-3), 467-474.

Kerrn-Jespersen J.P., Henze M., Strube R. (1994), Biological phosphorus release and uptake under alternating anaerobic and anoxic conditions in a fixed-film reactor, Water Res., 28, 1253-1255.

Kuba T., Wachtmeister A., van Loosdrecht M. C. M., Heijnen J. J. (1994), Effect of nitrate on phosphorus release in biological phosphorus removal systems, Water Sci. Technol., 30 (6), 263-269.

Kuba T., Smolders G. J. F., van Loosdrecht M. C. M., Heijnen J. J. (1993), Biological phosphorus removal from wastewater by anaerobic and anoxic sequencing batch reactor, Water Sci. Technol., 27, 241-252.

Lee S.H., Nam S. Y., Lim J.L., Lim K.H. and Shin H.S. (2003), Phosphorus uptake and denitrification by the denitrifying phosphorus removing bacteria under anoxic phase, 76th Water Environment Federation's Technical Exhibition and Conference, Water Environment Federation, Los Angeles, California U.S.A.

Metcalf and Eddy (2003), Wastewater engineering: Treatment and reuse, 4th Edition, McGraw-Hill, New York., p. 627 and p. 801.

Smolders G.J.F., Van der Meij J., Van Loosdrecht M.C.M. and Heijnen J.J. (1994), Model of the anaerobic metabolism of the biological phosphorus removal process; stoichiometry and pH influence, Biotechnol. Bioeng., 43, 461-470.

Sorm R., Bortone G., Saltarelli R, Jenicek P., Wanner J. and Tilche A. (1996), Phosphate uptake under anoxic conditions and fixed-film nitrification in nutrient removal activated sludge system, Water Res., 30 (7), 1573-1584.

You S. J., Hsu C. L., Chuang S. H., Ouyang C.F. (2003), Nitrification efficiency and nitrifying bacteria abundance in combined AS-RBC and A2O systems, Waer Res., 37 (10), 2281-2290.

Barker, P.S., Dold, P.L. (1996), Denitrification Behaviour in Biological Excess Phosphorus Removal Activated Sludge Systems, Water Res., 30 (4), 769-780.

Wentzel, M. C., Ekama, G.A., Dold, P.L., Marais, GvR., (1990), Biological excess phosphorous removal—Steady state and process design, Water Res., 16(1).

* cited by examiner

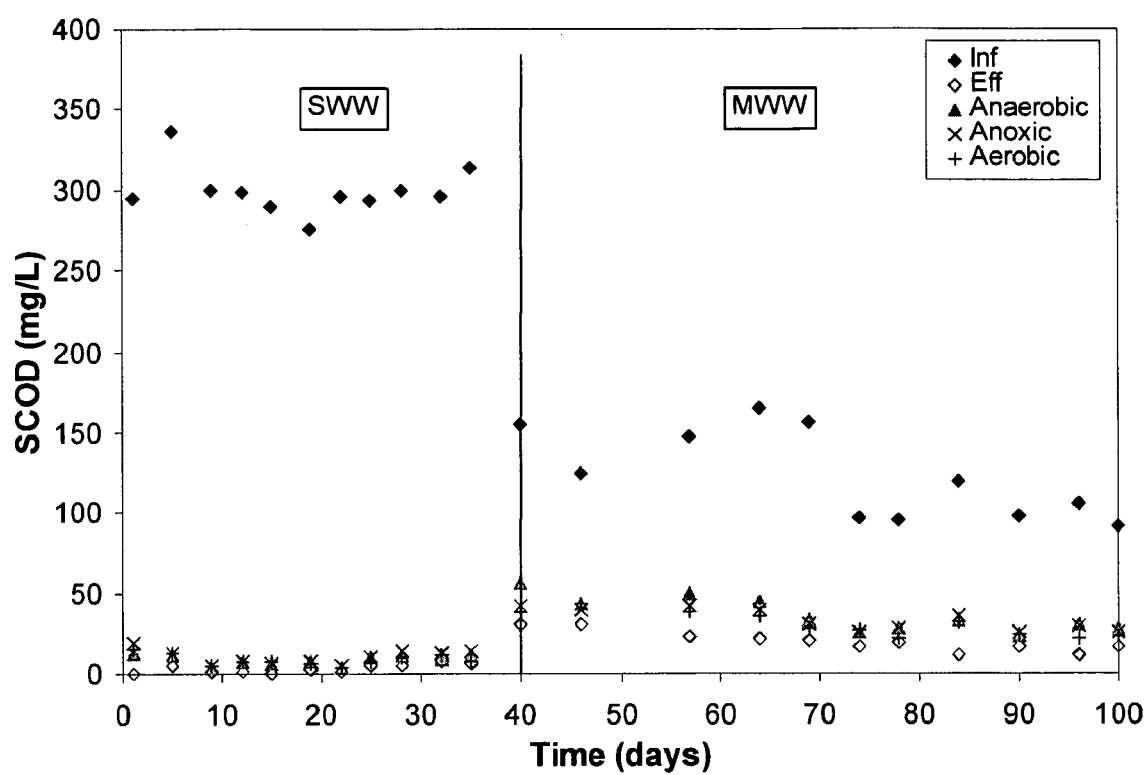
Fig. 6: SCOD profiles

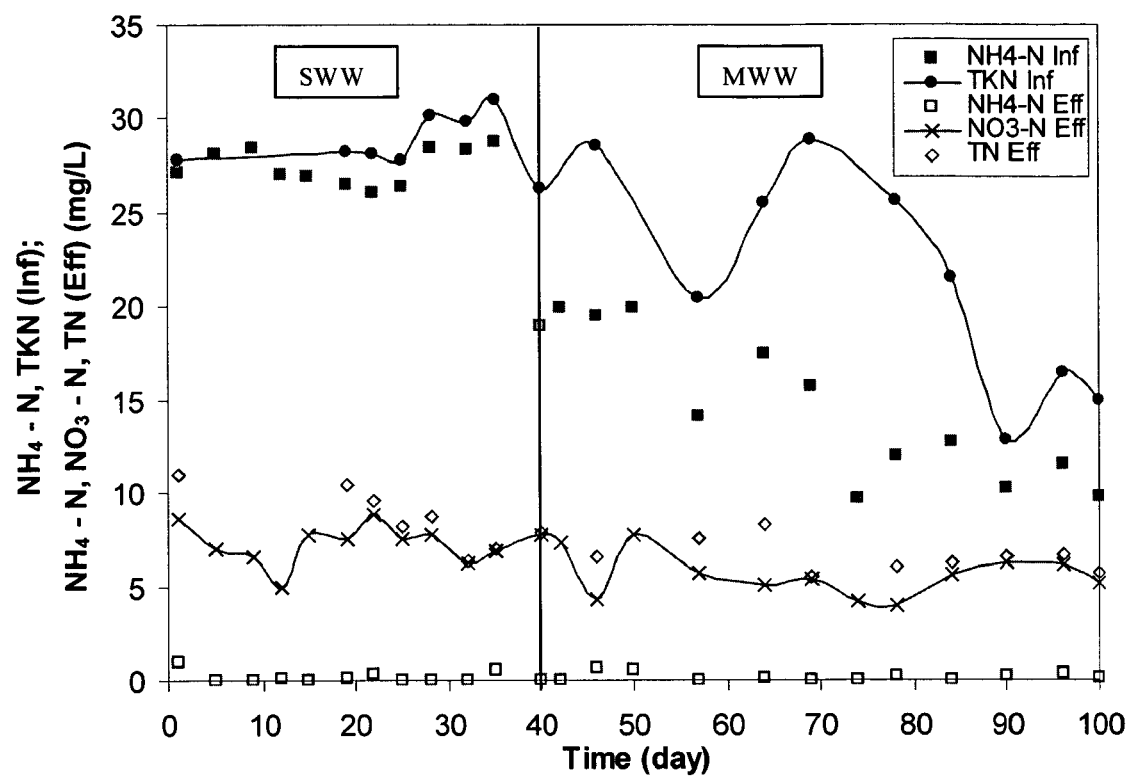
Fig. 7: Nitrogen profiles

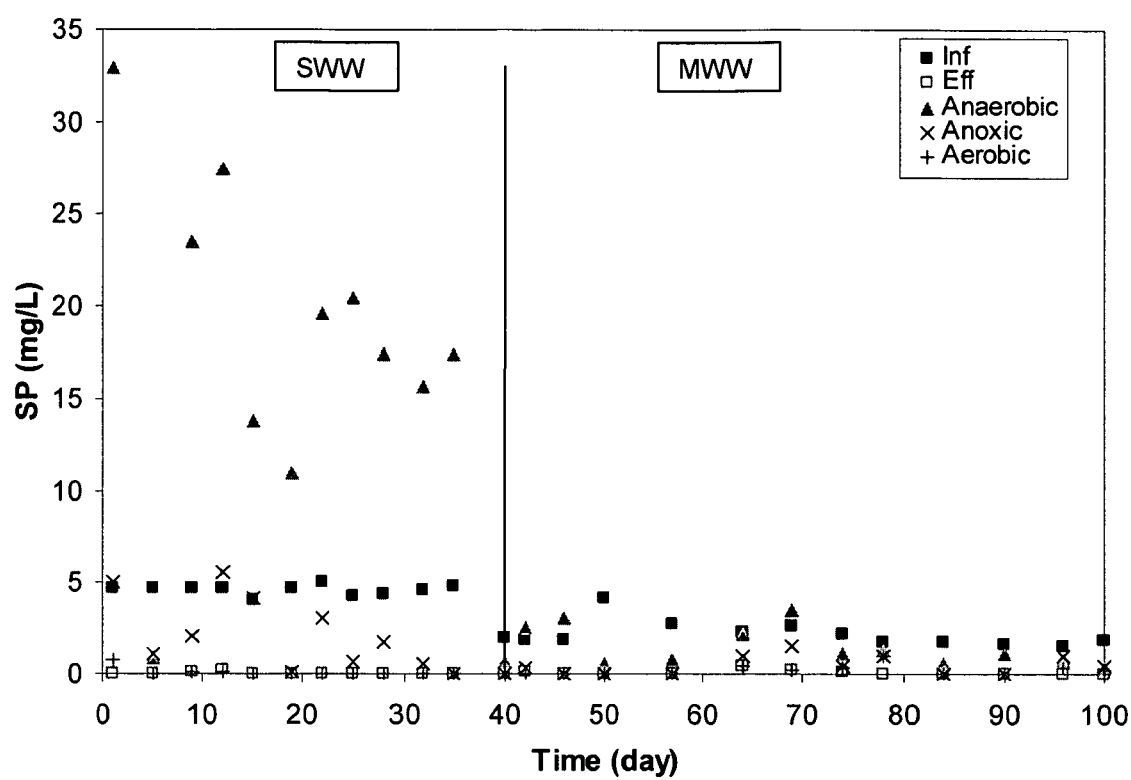
Fig. 8: Soluble Phosphorus profiles

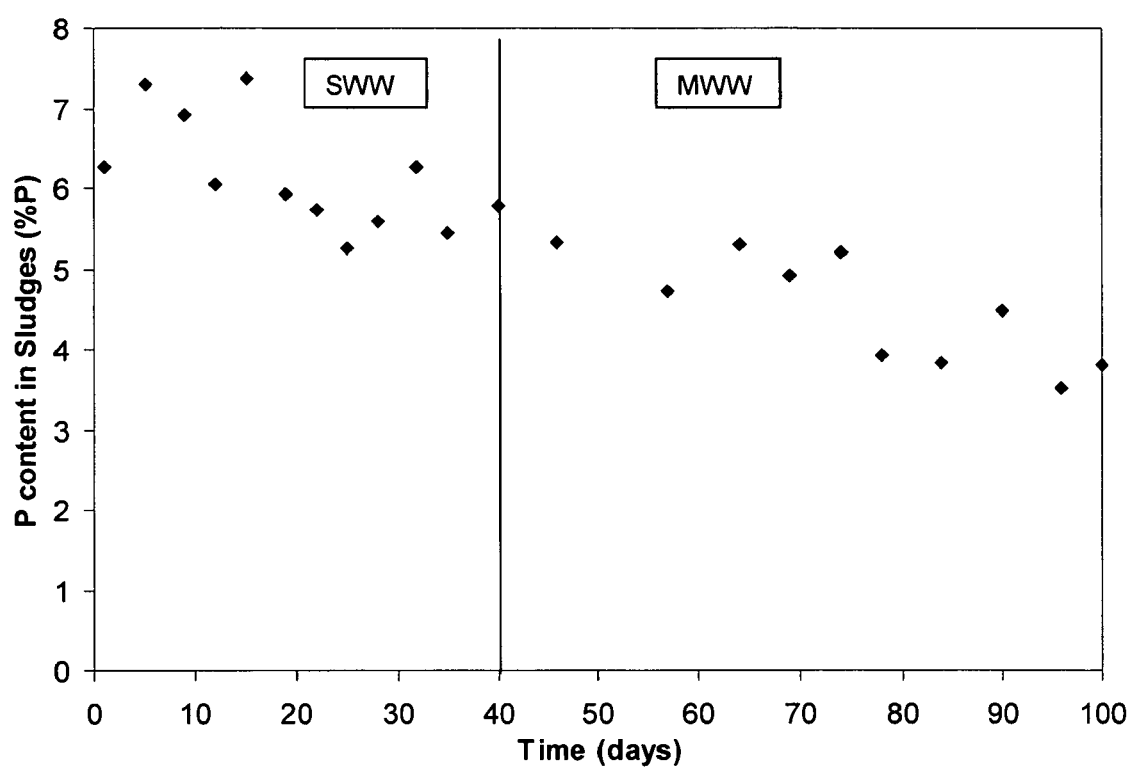
Fig. 9: Phosphorus content in biomass

TREATMENT OF WASTEWATER CONTAINING PHOSPHOROUS AND NITROGEN

FIELD OF THE INVENTION

The invention relates to a wastewater treatment method and process for biologically treating wastewater containing phosphorous and nitrogen. More particularly, the invention relates to treatment of wastewater containing phosphorous and nitrogen using anaerobic and anoxic biological treatment in combination with intermediate solids separation.

BACKGROUND OF THE INVENTION

Biological nutrient removal (BNR) systems are used in the treatment of wastewater containing nitrogen (N) and phosphorous (P). N removal is conventionally accomplished using a two stage treatment process. In the first stage, aerobic nitrification is used to oxidize ammonia to nitrite and then to nitrate. The effluent of this process is then direct to a second stage, in which anoxic de-nitrification is used to reduce nitrate to nitrite and then to $N_2$ gas. In continuous flow systems, the two stage process normally is conducted in two separate vessels or two separate zones within a single vessel. It is also known to conduct simultaneous nitrification-denitrification (SND) in which N removal is achieved in a single anoxic reactor through partial oxidation of ammonium to nitrite, which is then directly converted to $N_2$ gas. However, regardless of the process configuration, the de-nitrifying bacteria require a source of carbon for cell growth and it is typically the availability of a carbon substrate in the de-nitrification stage that limits the overall rate of N removal.

P removal is achieved through enhanced biological phosphorus removal (EBPR) under alternating anaerobic-aerobic conditions using polyphosphate accumulating organisms (PAO's). Phosphate is normally released by PAO's under anaerobic or anoxic conditions and accumulated under aerobic conditions. When appropriate process parameters are selected (for example, solids retention time (SRT), hydraulic residence time (HRT), chemical oxygen demand (COD), pH, temperature, and the like), the accumulation of phosphorous exceeds the rate of release and the net effect is the accumulation of phosphorous in the aerobic bio-reactor sludge. Since biomass formation is reliant upon the availability of a carbon substrate, the capacity of the system for phosphorous uptake is dependent upon the concentration of organic carbon, expressed as COD. It is typically the availability of COD that limits the overall rate of phosphorous removal in EBPR systems.

Biological processes for the combined treatment of wastewater containing phosphorous and nitrogen are known. Examples of these include the A2O, Bardenpho, Johannesburg, University of Cape Town (UCT), and modified UCT (MUCT) processes. In these processes, phosphorous uptake predominantly occurs in an aerobic treatment step following de-nitrification of the effluent. However, since de-nitrification and phosphorous uptake both consume the same organic carbon substrate, the rate of phosphorous removal is typically limited by the availability of COD in the wastewater. This slow rate of P removal increases the required hydraulic residence time of the process.

Many of these conventional BNR processes for combined N and P removal utilize a series of bio-reactors. The desired residence time in each bio-reactor is adjusted by controlling the influent flow rate. Since phosphorus is removed only through sludge disposal, a short SRT is desirable; however, for nitrogen removal through nitrification, a longer SRT is needed due to the slow growth of the nitrifiers. Thus, there is a SRT conflict between the N and P removal operations. Control of proper oxidation-reduction potential in each bio-reactor is difficult to achieve using flow rate alone. As a result, it is desirable to use multiple bio-reactors linked with recycle streams for BNR processes.

It has been reported that denitrification can be accomplished in anaerobic-anoxic EBPR systems using denitrifying phosphorous accumulating organisms (DPAOs), which perform simultaneous nitrate/nitrite reduction and P uptake using the same organic substrate (Kuba et al., 1993; Kerrn-Jespersen et al., 1994). Use of DPAOs results in lower COD demand, reduced aeration cost, and less sludge production than in conventional BNR systems. Competition for carbon amongst metabolic pathways of these organisms typically favours de-nitrification over phosphorous accumulation in the presence of nitrate. Gerber et al. (1986, 1987) has stated that, for DPAO's, the availability of organic substrate determines whether or not a net P uptake or P release is observed under anoxic conditions in the presence of nitrate. Out of the twelve different substrates tested, P release in the presence of nitrate occurred with formate, acetate and propionate; however, all other substrates tested (glucose, methanol, settled sewage, TCA cycle intermediates (citrate and succinate) and a number of glucose fermentation products) failed to induce P release until nitrate was consumed. The rate of phosphorous uptake is related to the rate of phosphorous release and therefore if the rate of phosphorous release is retarded, the rate of uptake will also be compromised. As a result, when used in conventional processes that conduct aerobic nitrification prior to phosphate removal, DPAO's are typically incapable of simultaneously removing phosphates and nitrates to the level required for meeting practical treatment objectives.

The Dephanox process (Bortone, et al., 1996) makes use of DPAO's to conduct phosphorous uptake in an anoxic bio-reactor. In the Dephanox process, phosphorous removal is preceded by nitrification, as is conventionally done, using a fixed film aerobic bio-reactor. The fixed film reactor type is chosen to maintain the concentration of nitrifiers in the aerobic bio-reactor. The effluent of the fixed-film aerobic bio-reactor flows directly to the anoxic bio-reactor. To make up for the organic carbon consumed during de-nitrification, sludge from a clarifier preceding the aerobic bio-reactor is provided to the anoxic bio-reactor. The anoxic bio-reactor thus treats both the aerobic bio-reactor effluent and the clarifier sludge. The anoxic bio-reactor causes phosphorous uptake and is followed by a suspended growth second aerobic bio-reactor for regeneration of the DPAO's through oxidation of intracellular phosphorous storage products. A second clarifier is used after the suspended growth second aerobic bio-reactor to create an aerobic bio-reactor sludge that is returned to the head of the process for anaerobic treatment with the incoming wastewater. However, the presence of nitrates in the nitrified effluent from the second aerobic bio-reactor, which is also recycled to the anaerobic bio-reactor, limits the amount of P release in the anaerobic bioreactor. This limitation occurs because most of the readily biodegradable organic carbon is utilized for denitrification in the anaerobic bioreactor, leaving less readily biodegradable organic carbon for anaerobic P release. As a result, the overall P removal in the Dephanox process is compromised. This is true of any BNR process that recycles nitrates with return activated sludge to the anaerobic bioreactor.

In aerobic wastewater treatment, membranes are sometimes used to improve the effectiveness of conventional suspended growth systems, such as activated sludge (AS). Suspended growth aerobic rectors incorporating membranes are referred to as membrane bio-reactors (MBR's). MBR's offer many benefits over conventional suspended growth systems, such as: small footprint and HRT requirements; better effluent water quality; disinfection; less sludge production; and the ability to retain biomass within the reactor, facilitating more precise control of SRT and leading to improved operational stability and robustness. For biological N removal, the long SRT and high-suspended solids concentration achieved in the MBR prevents wash out of slow-growing nitrifying bacteria and also improves the nitrifying capability of the system. Since most MBR systems employ a single reactor, the same SRT applies for nitrification and denitrification; this necessitates a large system, since aerobic nitrification is the rate limiting step. While MBRs have been demonstrated for biological N and P removal individually (Fan et al., 1996, Cicek et al., 1999), combined biological N and P removal in MBR's has not been demonstrated.

Several attempts have been made to use MBR processes for BNR. U.S. Pat. No. 6,485,645 (Husain, et al.) discloses a biological process for removing nitrogen through nitrification-denitrification and phosphorus using enhanced biological phosphorous removal (EBPR). The aerobic removal of phosphorous by EBPR produces more sludge, than anoxic P uptake, increases the demand for organic carbon, and requires much higher aeration energy. In particular, the process employs an anaerobic reactor that represents only about 9% of the total bioreactor volumes, corresponding to an HRT<1 hour, which is too small to provide significant P treatment. A membrane filter is disclosed for use in the aerobic nitrification reactor. This process is inefficient for treating wastewater containing both phosphorous and nitrogen, particularly where biodegradable organic carbon is limited.

The need therefore still exists for an improved method and process for the treatment of wastewater containing phosphorous and nitrogen.

SUMMARY OF THE INVENTION

According to an aspect of the present invention, there is provided a method of treating wastewater comprising: anaerobically treating the wastewater to remove soluble organic carbon therefrom to produce an anaerobically treated effluent; separating a sludge comprising insoluble organic carbon from a liquid fraction of the anaerobically treated effluent; and, anoxically treating the sludge separately from the liquid fraction. Each step of the method may be performed sequentially and separately. The anoxic treatment of the sludge may be performed by a microbial population comprising DPAO's. The anoxic treatment of the sludge may produce an anoxic biomass that is rich in phosphorous. The anoxic biomass may be recycled for anaerobic co-treatment with the wastewater. The anaerobic treatment may produce an anaerobic biomass and the anaerobic biomass may be rich in sorbed organic carbon. The liquid fraction may comprise ammonia and the method may further comprise aerobically treating the liquid fraction. The aerobic treatment may produce an aerobic biomass and the method may further comprise anoxically co-treating the aerobic biomass with the sludge. The anoxic treatment may produce an anoxic treatment effluent and the method may further comprise aerobically co-treating the anoxic treatment effluent with the liquid fraction. The aerobic treatment may produce an aerobic treatment effluent and the method may further comprise filtering the aerobic treatment effluent using a filter means. The filter means may comprise a membrane filter.

According to another aspect of the present invention, there is provided a wastewater treatment process comprising: providing a wastewater to an anaerobic bio-reactor; removing soluble organic carbon from the wastewater in the anaerobic bio-reactor; providing an anaerobic bio-reactor effluent to a clarifier; separating a clarifier sludge comprising insoluble organic carbon from the anaerobic bio-reactor effluent in the clarifier and creating a clarifier supernatant comprising ammonia; providing the clarifier sludge to an anoxic bio-reactor; and, directing the clarifier supernatant for further treatment other than in the anoxic bio-reactor.

In one embodiment, the process may further comprise: creating an anoxic biomass in the anoxic bio-reactor, the anoxic biomass rich in phosphorous; and, recycling the anoxic biomass to the anaerobic bio-reactor.

In another embodiment, the process may further comprise: providing the clarifier supernatant comprising ammonia to a suspended growth aerobic bio-reactor; and, nitrifying the ammonia from the clarifier supernatant in the aerobic bio-reactor.

In yet another embodiment, the process may further comprise: creating an aerobic biomass in the aerobic bio-reactor; and, recycling the aerobic biomass to the anoxic bio-reactor.

In still another embodiment, the process may further comprise: providing an anoxic bio-reactor effluent comprising residual nitrogen to the aerobic bio-reactor; and, treating the residual nitrogen from the anoxic bio-reactor effluent in the aerobic bio-reactor.

In even another embodiment, the process may further comprise: creating an aerobic bio-reactor effluent in the aerobic bio-reactor; and, filtering the aerobic bio-reactor effluent using a filter means. The filter means may comprise a membrane filter and may be located either within or outside the aerobic bio-reactor.

The invention may utilize a microbial population comprising DPAO's in the anoxic treatment step. The DPAO's may be present as part of a mixed microbial population comprising aerobic PAO's. The insoluble organic carbon separated from the anaerobic reactor effluent is used by the DPAO's as a carbon rich feed source. Since the nitrates are recycled from the aerobic to the anoxic bio-reactor, DPAO's permit anoxic P uptake and simultaneous denitrification, thereby improving carbon utilization. This lowers the competition for carbon among heterotrophs for denitrification. The anoxic bio-reactor may be of any suitable type and is preferably well mixed. Conditions within the anoxic bio-reactor may be optimized for the treatment of phosphorous. For example, dissolved oxygen (DO), SRT, HRT, COD, pH, temperature and/or nitrate levels may be selected to favour phosphorous accumulation. The biomass produced during the anoxic treatment step is typically rich in phosphorous and may be wasted and/or recycled for further treatment. For example, the phosphorous rich anoxic biomass may be recycled to the anaerobic bio-reactor for further treatment; this reduces the overall volume of sludge produced in the process and surprisingly results in high levels of soluble organic carbon removal from the wastewater during anaerobic treatment. This may be due in part to certain properties of the phosphorous rich anoxic biomass that favour bio-sorption of soluble organic carbon. The biomass produced during anaerobic treatment may therefore be rich in sorbed soluble organic carbon.

The anaerobic bio-reactor is agitated and may be selected based on the properties of the wastewater being treated, as is known in the art. Conditions within the anaerobic bio-reactor may be optimized for the treatment of phosphorous. For example, DO, SRT, HRT, COD, pH, temperature and nitrate levels may be selected to favour phosphorous release. The anaerobic treatment effluent is low in soluble organic carbon relative to the influent, but contains insoluble organic carbon, ammonia and phosphorous.

The separation of biomass comprising insoluble organic carbon from the liquid fraction of the anaerobic treatment effluent may be accomplished by any suitable means. Separation may be accomplished by employing a physical barrier, gravity or centrifugal forces through use of, for example, filters, clarifiers, centrifuges, or hydrocyclones. The term "clarifier" as used herein may include any process vessel that performs gravity separation, for example de-watering thickeners, lamellar clarifiers, etc. Separation may occur in a separate process vessel or within a distinct part of either the anaerobic or anoxic process vessels. The separation step contemplated herein is in addition to any separation that normally occurs in anaerobic or anoxic process vessels and is directed towards the further removal of insoluble organic carbon from the anaerobic treatment effluent.

After separation of the insoluble organic carbon, the clarifier supernatant is low in both soluble and insoluble organic carbon, but may be rich in ammonia and phosphorous. The clarifier supernatant may further comprise soluble organic nitrogen. The clarifier supernatant is directed for further treatment separately from the clarifier sludge. The further treatment therefore preferably takes place in a vessel other than the anoxic bio-reactor.

The further treatment of the clarifier supernatant normally comprises aerobic nitrification to convert the biodegradable organic nitrogen and ammonia to nitrate. The nitrate-containing mixed liquor of this aerobic treatment is provided to the anoxic bio-reactor for de-nitrification. Aerobic treatment may be provided using any suitable suspended growth bio-reactor, as it is desirable that the aerobic treatment produces biomass for recycle to the anoxic bio-reactor. When a mixed population comprising nitrifying microorganisms and PAO's are used during aerobic treatment, phosphorous uptake may occur. The aerobic bio-reactor may therefore be used to achieve P uptake as well as nitrification. In this case, the aerobic biomass contains phosphorous and may be wasted and/or recycled for further treatment to reduce sludge volume. Due to the removal of organic carbon prior to aerobic treatment the quantity of produced aerobic biomass is advantageously reduced. In addition, the aerobic bio-reactor does not have to be sized for carbon removal, thereby reducing its required HRT.

The filter means in the aerobic reactor may be of any suitable type. The filter means may comprise: a permeable bed of solid media; a porous filter medium; a screen; a membrane; etc. It is desirable that the filter means be kept clean in order to the maintain the desired permeate flux, especially in open channel applications where the available wastewater head is limited. Any suitable means or method may be used to keep the filter means clean, and the filter means may be manually cleaned, automatically cleaned, or self-cleaning. Examples of potential cleaning methods include periodic back-washing or semi-continuous back pulsing, either with permeate or with a gas, such as air. The filter means may be utilized in a cross-flow configuration as an aid to maintaining cleanliness and lowering pressure drop. The filter means may be located separately from the aerobic treatment vessel (for example, within a closed housing or open channel separate from the aerobic treatment vessel) or may alternatively be located within the aerobic treatment vessel. A membrane immersed within the aerobic treatment vessel is preferred for ease of cleaning and for retaining the slow growing nitrifying biomass within the aerobic bio-reactor. When provided outside the aerobic treatment vessel, the retentate may be directed to either the aerobic bio-reactor, the anoxic bio-reactor, or a combination thereof. Providing retentate to the anoxic bio-reactor may obviate the need for any separate recycle stream between the aerobic and anoxic bio-reactors.

A membrane may comprise a filter with a pore size in the micrometer or nanometer range. Suitable membrane types include hollow fiber, tubular or reverse osmosis membranes. The pore sizes of these membranes is preferably less than 1 $\mu$m, more preferably from about 0.04 to 0.2 $\mu$m. Membranes may be made from physical solids (metals, ceramic, etc.), homogenous films (polymer, metal, etc.), heterogeneous solids (polymer mixes, mixed glasses, etc), solutions (usually polymer), asymmetric structures, and liquids. North American manufacturers of suitable membranes are Zenon Environmental Inc., Kubota Corporation, Koch membrane systems and Pall Filtration Systems.

The invention is preferably operated on a continuous flow basis. Although preferably conducted in separate vessels, any two or more steps may be performed within separate zones of a single vessel, albeit with certain disadvantages in terms of independent residence time control, etc. as previously described.

The wastewater treatment method and process of the present invention provides a number of advantages over the prior art. By limiting the introduction of nitrates to the anaerobic bio-reactor, competition for organic carbon due to de-nitrification is reduced, permitting a greater extent of P release to occur in the anaerobic bio-reactor concomitant with a higher P uptake in the anoxic bio-reactor. In separating insoluble organic carbon from the anaerobic effluent, a carbon rich sludge is generated that can be used as a carbon source by non-DPAO denitrifiers and DPAO's in the anoxic treatment step; this provides sufficient carbon to permit denitrification and phosphorus uptake to occur simultaneously in the anoxic bio-reactor. This is particularly beneficial for wastewaters that are characterized by low organic content relative to nitrogen and phosphorus since it optimizes organic carbon utilization and eliminates the potential requirement for additional organic carbon in the form of methanol, acetate and glucose to promote efficient biological removal of both nitrogen and phosphorus. The removal of insoluble organic carbon in the clarifier sludge and redirecting the ammonia-rich supernatant to the aerobic bio-reactor reduces the carbon load to be treated aerobically, and accordingly the size of the aerobic bio-reactor is reduced. Denitrifiers have a lower sludge yield per unit mass of organic carbon biodegraded than aerobic heterotrophs and the utilization of organic carbon for denitrification will therefore lower sludge production. Furthermore in this process, since colloidal and particulate organic matter is treated in the anoxic bioreactor through the sequential processes of hydrolysis and biodegradation, as opposed to the combination of biodegradation and physical entrapment that would occur in conventional processes, sludge production is reduced even further in comparison with existing treatment technologies.

When compared with the Dephanox process, the present invention provides several advantages. The present invention omits two key units from the Dephanox process, namely the fixed-film aerobic nitrification reactor and the final clarifier. Also, the present invention utilizes only a single sludge stream as opposed to the two sludge streams (fixed film aerobic and suspended growth aerobic) used in the Dephanox process. The number of bioreactors is fewer in the present invention and the size of each reactor is smaller, resulting in lower capital and operating costs. Both the denitrification efficiency and phosphorus removal efficiency of the Dephanox process are lower than in the present invention. In the Dephanox process, the nitrates from the second aerobic stage are not recycled to the anoxic bio-reactor for denitrification, as in the present invention, but instead return to the anaerobic bio-reactor from the final clarifier. The relatively high influent nitrates to the anaerobic bio-reactor compromises biological P release and creates an unfavourable competition for readily biodegradable organic carbon in the anaerobic tank between denitrifiers and PAOs.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIG. 6 depicts SCOD profiles in an experimental system according to the fifth embodiment of the present invention;

FIG. 7 depicts nitrogen profiles in an experimental system according to the fifth embodiment of the present invention;

FIG. 8 depicts soluble phosphorous (SP) profiles in an experimental system according to the fifth embodiment of the present invention; and, FIG. 9 depicts phosphorous content in biomass produced in an experimental system according to the fifth embodiment of the present invention.

DESCRIPTION OF PREFERRED EMBODIMENTS

Figure 1:
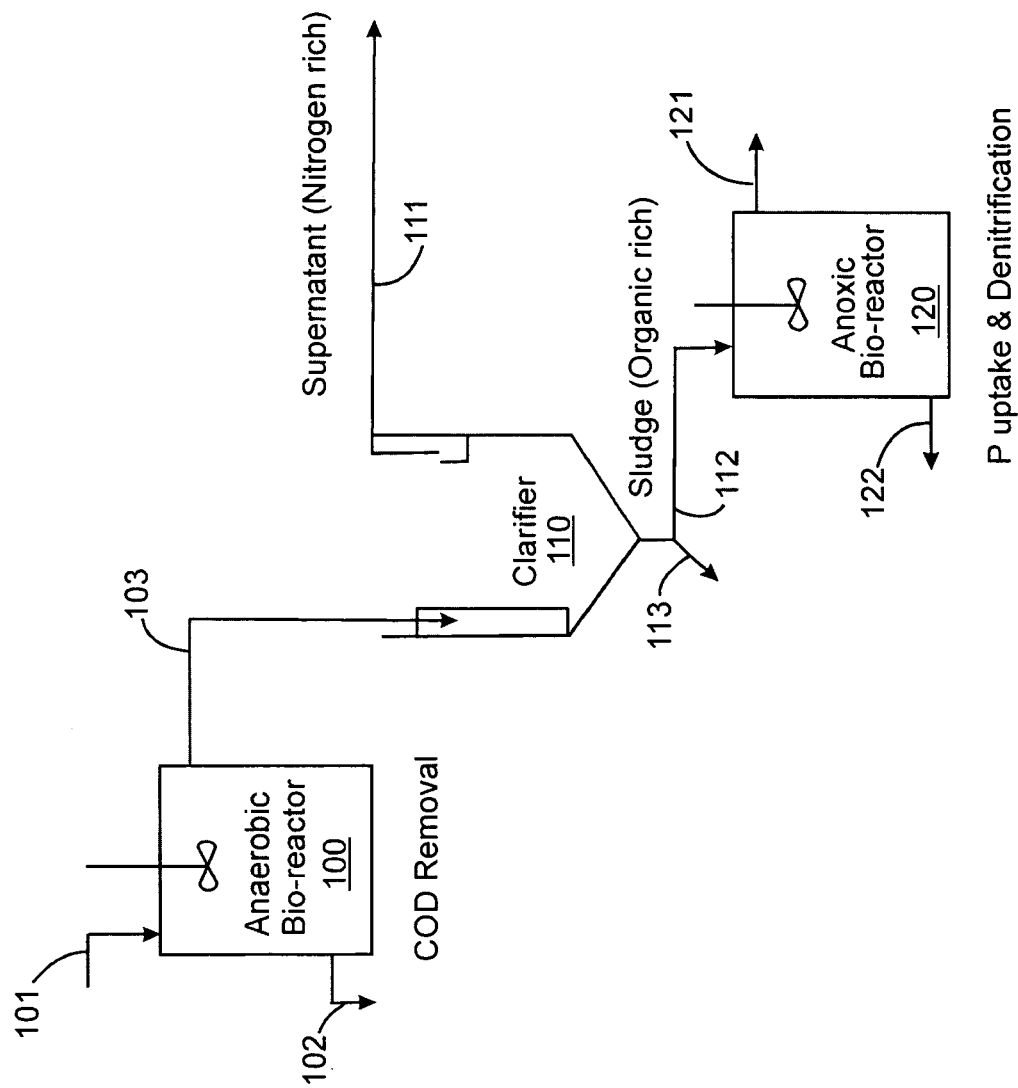
FIG. 1 is a schematic drawing of a first embodiment of a process according to the present invention.

Referring to FIG. 1, a first embodiment of a process according to the present invention includes an anaerobic bio-reactor 100, a clarifier 110 and an anoxic bio-reactor 120. The anaerobic bio-reactor 100 is supplied with wastewater containing organic carbon, nitrogen and phosphorous through wastewater inlet 101. The anaerobic bio-reactor shown in FIG. 1 is of the well-mixed type. Volatile fatty acids (VFAs) are removed from solution in the anaerobic bio-reactor 100 by PAOs while releasing orthophosphates. The VFAs are stored by PAOs as an intracellular product, polyhydroxybutyrate. Denitrifying organisms also utilise readily biodegradable soluble COD to denitrify any residual concentration of nitrates in the sludge recycled from the anoxic bio-reactor 120. Additionally, due to the sludge recirculation through the anaerobic bioreactor, a portion of the soluble organic carbon is physically sorbed onto the sludges. This results in a reduction in soluble COD (SCOD). The sorbed carbon in the anaerobic biomass is further utilized in downstream processes. The anaerobic bio-reactor effluent is directed to clarifier 110 through anaerobic bio-reactor effluent line 103.

The insoluble organic carbon is removed as clarifier sludge from a liquid fraction of the anaerobic bio-reactor effluent in clarifier 110. The liquid fraction exits as clarifier supernatant through supernatant line 111. The clarifier supernatant is low in insoluble organic carbon, but is rich in ammonia. The supernatant typically comprises both ammonia and soluble organic nitrogen, which may be in a reduced form. Supernatant line 111 is directed to a unit other than the anoxic bio-reactor 120 for further treatment of the nitrogen. The clarifier sludge is removed from the clarifier through clarifier sludge line 112. A portion of the clarifier sludge may be wasted through sludge wastage port 113. The remainder of the organic rich clarifier sludge is directed to the anoxic bio-reactor 120.

The anoxic bio-reactor 120 is an agitated vessel containing DPAO's among other microbial cultures including aerobic PAO's and non-PAO denitrifiers. The DPAO's metabolize both nitrogen and phosphorous under anoxic conditions. It should be noted that in the anoxic bio-reactor, denitrification is achieved both by non-PAO denitrifiers as well as DPAOs, and thus the presence of sufficient nitrates and carbon in the influent to the anoxic bioreactor is important. In one embodiment, the recycled aerobic effluent provides the nitrates while the sludge comprising soluble organic carbon, sorbed organic carbon, and stored organic carbon (as PHB) provide the necessary carbon for denitrification. Thus, both de-nitrification and phosphorous accumulation occur in the anoxic bio-reactor 120. The anoxic bio-reactor effluent comprises residual ammonia from the clarifier sludge that is removed through anoxic bio-reactor effluent line 121 for further aerobic treatment. The anoxic biomass is rich in phosphorous due to the metabolism of the DPAO's and is removed from the anoxic bio-reactor through anoxic bio-reactor sludge line 122 for further treatment.

The first embodiment advantageously permits treatment of both phosphorous and nitrogen in the anoxic reactor. This reduces the hydraulic residence time of the process, resulting in capital and operating cost savings.

In the description and drawings of further embodiments of the invention, certain features are marked with indicia referred to in the description of preceding embodiments. The description associated with these indicia applies equally to all embodiments in which the indicia are used. Like features are therefore indicated by like indicia and need not necessarily be described in each embodiment.

Figure 2:
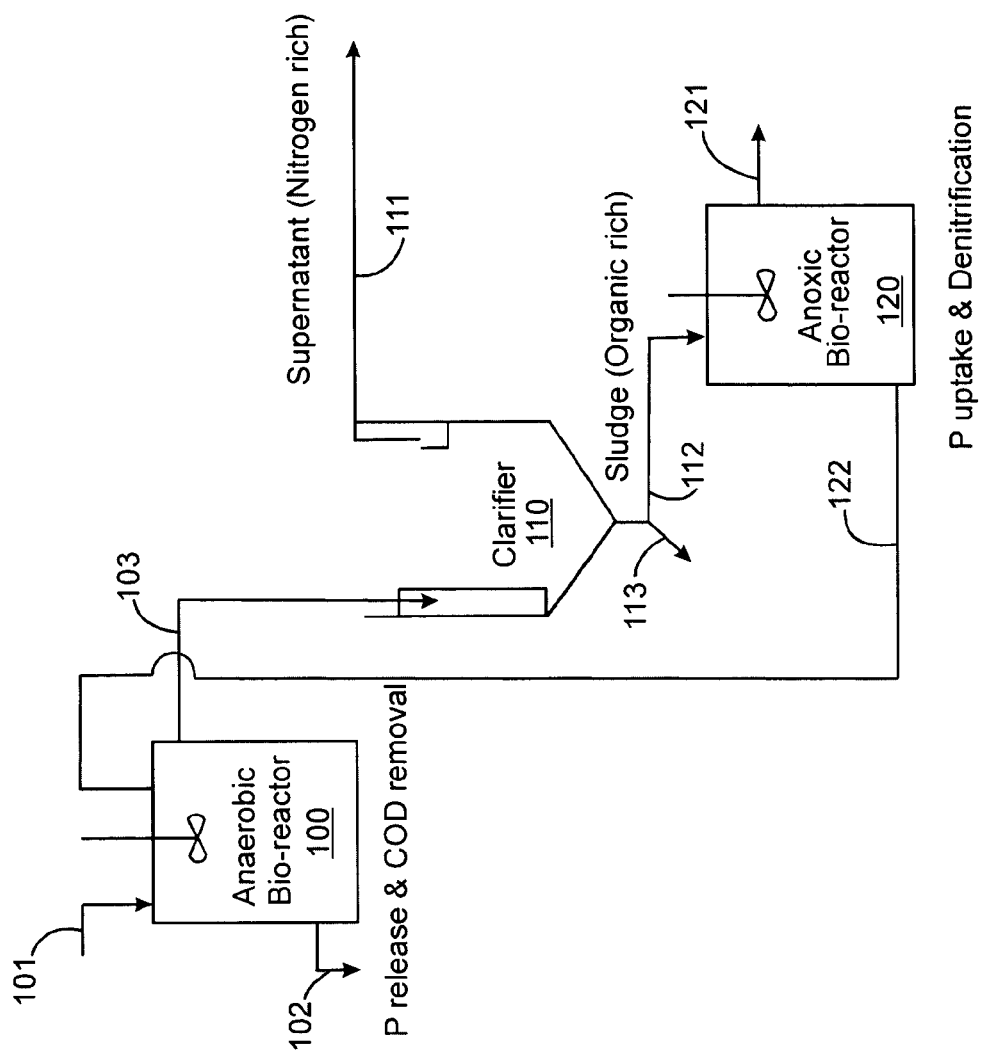
FIG. 2 is a schematic drawing of a second embodiment of a process according to the present invention.

Referring to FIG. 2, in a second embodiment of the invention the phosphorous rich anoxic biomass in line 122 is directed to the anaerobic bio-reactor for further treatment. Some of the phosphorous contained in the anoxic biomass is released in the anaerobic bio-reactor, only to be accumulated in the anoxic bio-reactor; this cycling between phosphorous uptake and release is known in the art, although the phosphorous accumulation usually occurs in an aerobic bio-reactor, not in an anoxic bio-reactor. The net result is the overall removal of phosphorous from the wastewater stream as sludge. The phosphorous rich biomass produced in the anoxic bio-reactor also has the surprising property of increasing the rate of soluble organic carbon removal due to bio-sorption on the biomass in the anaerobic bio-reactor.

This increased removal of soluble organic carbon advantageously reduces the required HRT of the anaerobic bio-reactor.

Figure 3:
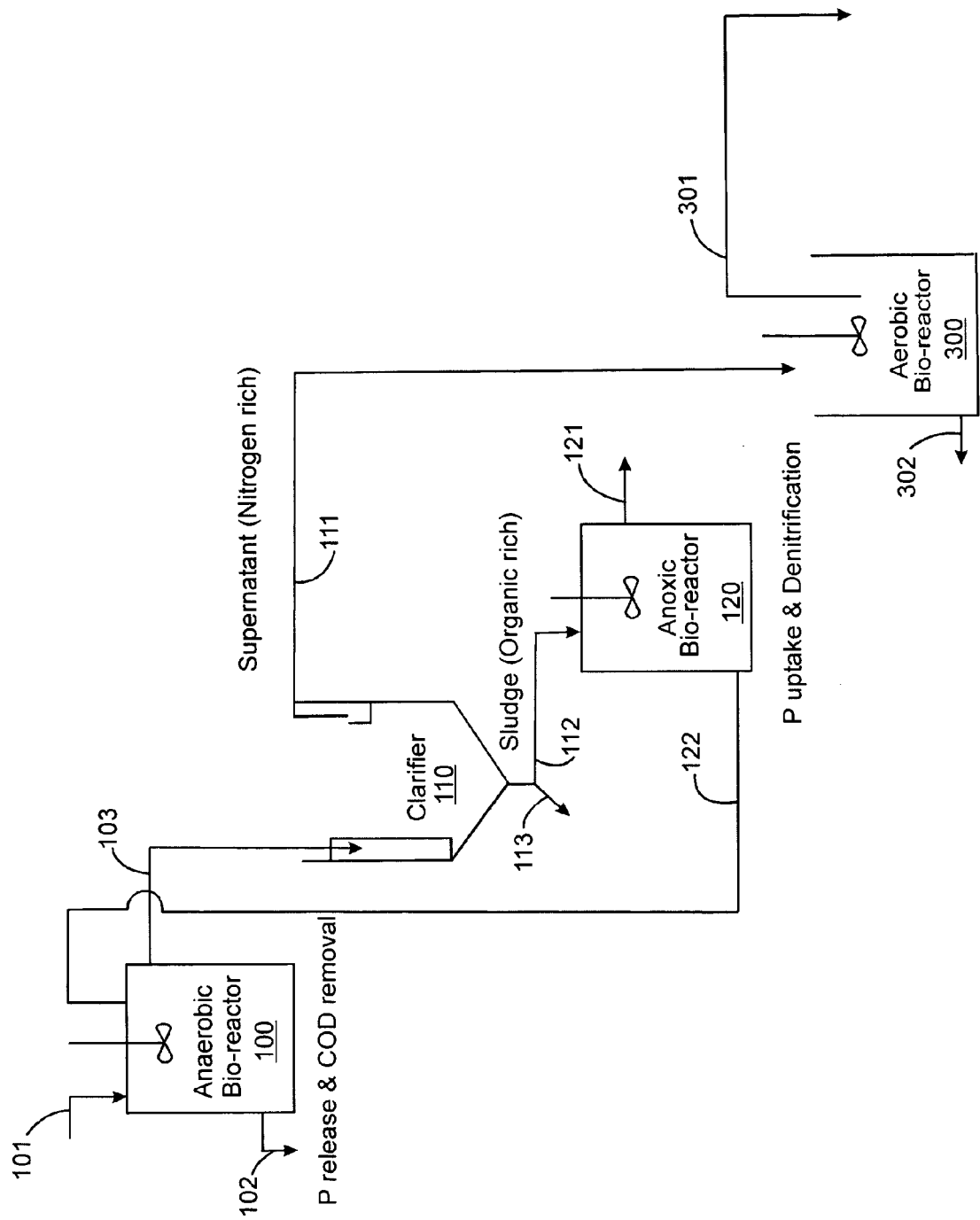
FIG. 3 is a schematic drawing of a third embodiment of a process according to the present invention.

Referring to FIG. 3, the nitrogen rich clarifier supernatant in line 111 is directed to an aerobic bio-reactor 300 for further treatment. The aerobic bio-reactor 300 is well-mixed due to aeration, and additional mixing may be provided by external means, as shown schematically in FIG. 3. The aerobic bio-reactor 300 contains a mixed population of nitrifying micro-organisms and PAO's. The nitrifying micro-organisms convert the ammonia and organic nitrogen in the clarifier supernatant to oxidized products, for example nitrite ($NO_2$) and nitrate ($NO_3$) These oxidized products are then passed to the anoxic reactor as part of the aerobic mixed liquor recycle stream, which comprises aerobic biomass. It is important that sufficient nitrate be provided to the anoxic bio-reactor to support the metabolism of denitrifiers and DPAO's. However, if too much nitrate is provided to the anoxic bio-reactor, excess nitrate will leak into the anaerobic bio-reactor where the DPAO's will undesirably favour denitrification over phosphorous release. Accordingly, the desired nitrate level in the anoxic bio-reactor is maintained through careful manipulation of the aerobic recycle stream flow rate. The PAO's accumulate phosphorous, which is removed as part of the aerobic biomass through aerobic bio-reactor sludge line 302. Treated effluent leaves through aerobic bio-reactor effluent line 301.

Due to the low organic carbon content of the clarifier supernatant, the aerobic bio-reactor is sized based on nitrification targets, rather than carbon removal targets, thereby reducing the reactor volume. Since there is a limited amount of carbon available for cell growth, a low volume of sludge is produced in the aerobic bio-reactor 300. As a result, the total amount of phosphorous removed by aerobic PAO's is relatively small compared with the anoxic bio-reactor 120.

Figure 4:
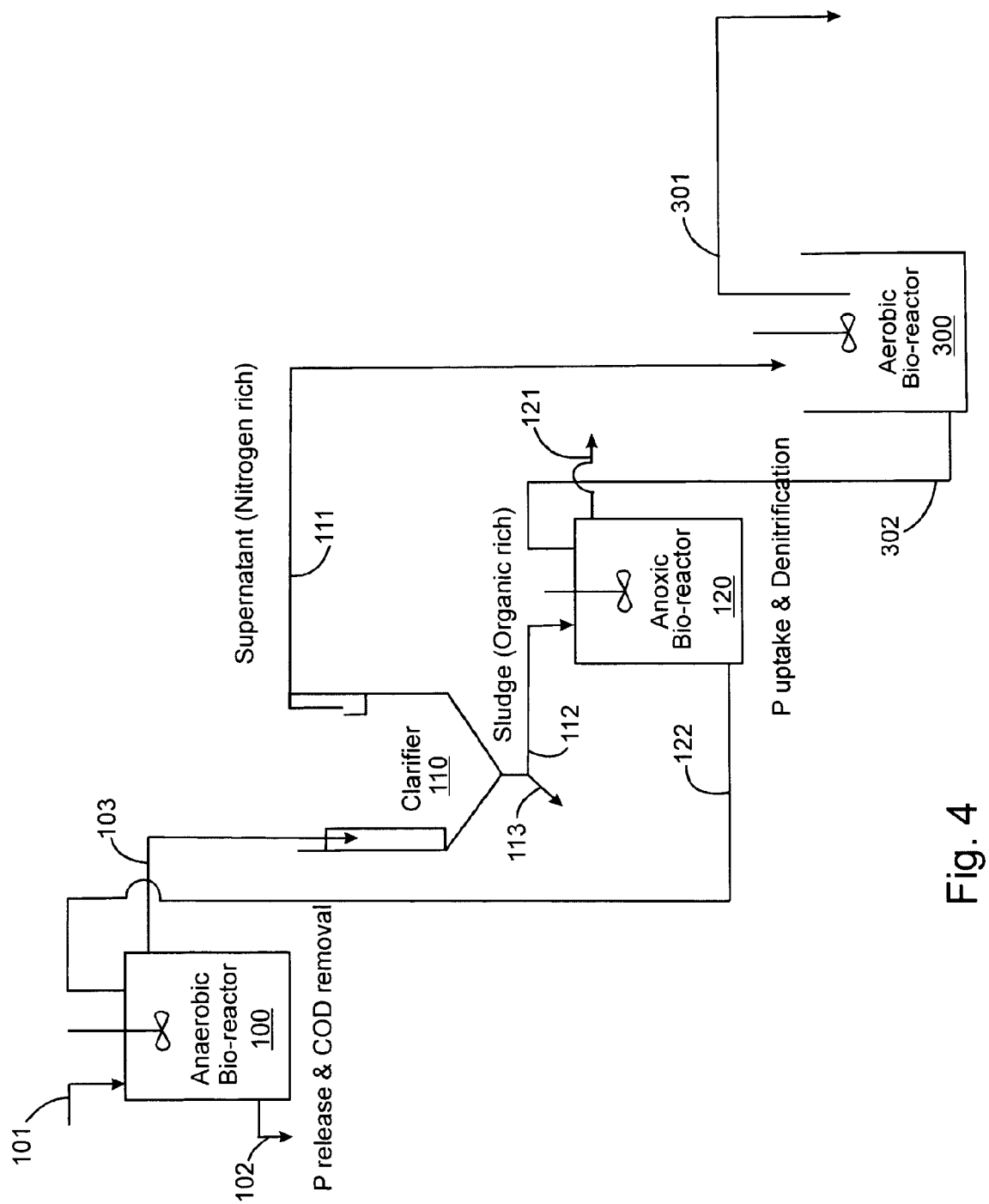
FIG. 4 is a schematic drawing of a fourth embodiment of a process according to the present invention; and, FIG. 5 is a schematic drawing of a fifth embodiment of a process according to the present invention.

Referring to FIG. 4, the aerobic biomass in line 302 is directed to the anoxic bio-reactor 120 for further treatment. The aerobic biomass acts as an additional source of nitrates for the non-PAO denitrifiers and the DPAOs in anoxic bio-reactor 120. However, the quantity of biomass provided through line 302 is much less than the quantity of sludge provided through clarifier sludge line 112. Aerobic PAOs are recycled from the aerobic bio-reactor 300 to the anoxic bioreactor 120. The mixed microbial culture comprising aerobic PAOs and DPAOs in the anoxic bio-reactor 120 is then returned to the anaerobic bioreactor 100 to induce P release and subsequent P uptake.

Figure 5:
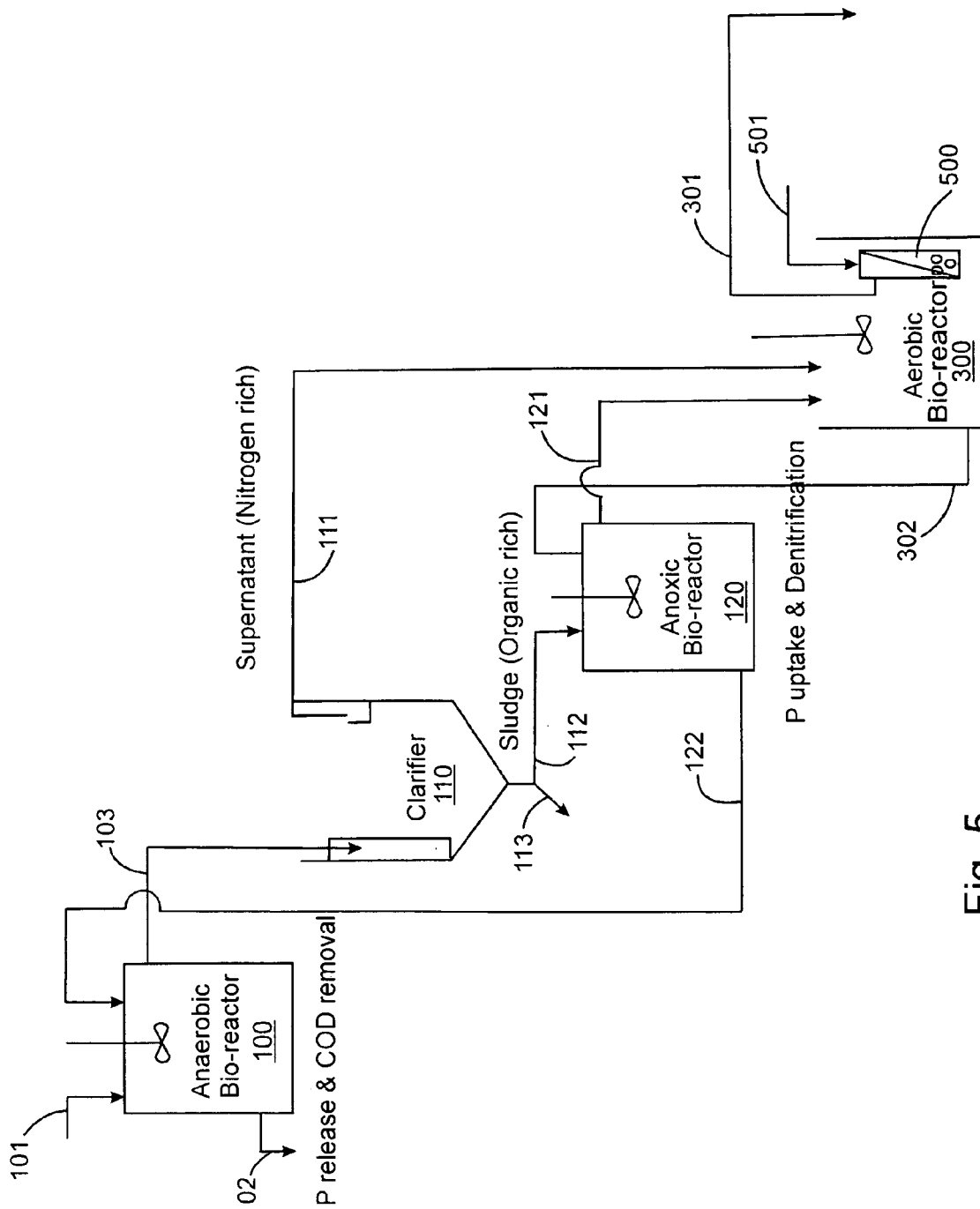

Referring to FIG. 5, a filter means 500 comprising a membrane filter is immersed within aerobic bio-reactor 300. The filter means 500 is cleaned by back-pulsing with air, supplied by air line 501, to dislodge any accumulated debris. The filter means 500 retains slow growing nitrifying bacteria within the aerobic bio-reactor 300 and reduces the need for downstream separation of solids, thereby decreasing the overall footprint of the system. The aerobic bio-reactor effluent 301 is normally compliant with legislated environmental standards and is usually discharged; however, the effluent 301 may be directed for additional treatment, for example disinfection by UV to inactivate viruses or other micro-organisms, depending on treatment objectives and the intended end use.

The embodiments are described herein illustratively and are not meant to limit the scope of the invention as claimed. Variations of the foregoing embodiments will be evident to a person of ordinary skill and are intended by the inventor to be encompassed by the claims.

The process and method will be further described with reference to the following examples.

EXAMPLE 1

An experimental system according to the fifth embodiment of the invention, shown in FIG. 5, was operated in the laboratory to obtain performance data. The experimental system consisted of anaerobic, anoxic and aerobic acrylic bio-reactors of 5, 5 and 10 L, respectively, and a clarifier made of clear PVC of 15 L volume (working volume 10 L). ZW-1 membranes (Zenon Environmental Systems Inc., Oakville, ON), with pore size of 0.04 μm and nominal membrane surface area of 0.047 $m^2$, were immersed in the aerobic bio-reactor and used as a final separation unit. Air (2-4 L/min) was introduced at the bottom of the membrane modules and served two main purposes: supplying oxygen for the bio-reactor and creating turbulent flow around the membrane surface to reduce membrane fouling. Peristaltic pumps (Masterflex, Model 77521-40, 77200-12, 77200-60, IL, USA) were used to transfer wastewater from one unit to another and a vacuum pump was used to collect effluent from the membranes for storage in an effluent tank. All three bio-reactors were continuously mixed using overhead laboratory mixers (Stir-Pak, Model 4554-14, 3-250/50-5000 rpm, IL, USA).

Performance of the experimental system was monitored regularly by analyzing the various bio-reactor effluents, permeate and clarifier supernatant for total suspended solids (TSS), volatile suspended solids (VSS), COD, total Kjeldahl nitrogen (TKN) and total phosphorus (P). The soluble fraction of the mixed liquor was obtained by centrifuging (3000 rpm for 10 min, Beckman Coulter, Allegra 6 series, California, USA) and then filtering through a 0.45 μm glass fiber filter paper (Whatman, 47 mm 1822 047) for analysis of soluble components (i.e. soluble COD (SCOD), soluble total Kjeldahl nitrogen (STKN), ammonia, nitrates, nitrites and orthophosphates). HACH equipment (HACH odyssey DR/2500 spectrophotometer and COD heating reactor) was used to measure COD and SCOD (Method 8000), $NH_4$—N (Method 10031), TKN and STKN (Method 8075) and total P (Method 10127) using standard HACH testing kits. $NO_3$—N, $NO_2$—N and soluble phosphorus (SP i.e. $PO_4$—P) were measured using Waters IC-Pak column and guard column (Waters, Mass., USA). All other analyses were performed according to standard methods for the examination of water and wastewater (APHA and AWWA, 1998): $BOD_5$ and $SBOD_5$ (Method 5210 B), TSS and VSS (Method 2540 D and Method 2540 E). Dissolved oxygen (DO), pH and oxidation-reduction potential (ORP) in the three bio-reactors were also routinely measured. A pH meter (Thermo Orion, Model 330, USA) was used to measure pH, while ORP was measured using a handheld multi-parameter instrument (WTW GmbH and Co. KG, Model multi 340i, Germany). DO was measured using a DO meter (YSI, Model 50, Ohio, USA). For all parameters, individual standards were run during each analysis. Calibration verification standards were prepared and analyzed for spectrophotometer calibration. All samples and standards were stored in an air tight container and refrigerated. Test results were accepted only if the minimum accuracy of measuring the standards was 95%. Occasionally, samples were sent to a certified local environmental laboratory for quality control purposes.

The experimental system was operated for 100 days using two types of wastewater. Synthetic wastewater (SWW) was used initially (day 1-39). The chemical composition of the SWW was: sodium acetate (350 mg/L), glycerol (12 mg/L), $NaHCO_3$ (11.6 mg/L), ammonium sulfate (133.6 mg/L), $MgSO_4.7H_2O$ (69.6 mg/L), $CaCl_2.2H_2O$ (22.5 mg/L), $KH_2PO_4$ (23.6 mg/L), $FeCl_3$ (1.1 mg/L), $CuSO_4.5H_2O$ (0.086 mg/L), $Na_2MoO_4.2H_2O$ (0.166 mg/L), $MnSO_4.H_2O$ (0.13 mg/L), $ZnCl_2$ (0.23 mg/L) and $CoCl_2.6H_2O$ (0.42 mg/L). Additionally, in order to test real municipal wastewater (MWW), effluent of the grit chamber of the Adelaide Pollution Control Plant (London, Ontario, Canada) was fed to the system at the later stages (day 40-100). Table I shows the typical characteristics of the synthetic wastewater and municipal wastewater that were used in this study. Both wastewater streams were fed to the system at a rate of 80 L/d.

and 6 turnovers of SRT (60 days) for MWW. The SWW contained negligible biomass as suspended solids with only 1 mg/L of TSS and VSS; whereas, for MWW the mixed liquor biomass averaged 160 and 128 mg/L of TSS and VSS respectively. The system generally operated at relatively low MLVSS levels in the range of 2000-3500 mg/L. The volatile fraction of sludge was slightly higher (~79-82%) while operating on SWW than with MWW (~72-75%). As expected, the membrane produced treated final effluent with non-detectable solids.

Table 2 provides a summary of final effluent parameters for the system. FIG. 6 depicts the SCOD profiles across the system. On average, 99±0.8% COD removal was observed

TABLE 1

Characteristics of Wastewater used in this Study

| Parameter (mg/L) | Synthetic WW | | Municipal WW | |
| --- | --- | --- | --- | --- |
| | Range | Average ± SD (n) | Range | Average ± SD (n) |
| TSS | 0-4 | 1 ± 1 (11) | 82-190 | 160 ± 35 (11) |
| VSS | 0-4 | 1 ± 1 (11) | 72-176 | 128 ± 29 (11) |
| COD | 285-328 | 299 ± 12 (11) | 230-399 | 329 ± 56 (11) |
| SCOD | 276-337 | 299 ± 15 (11) | 91-165 | 123 ± 28 (11) |
| BOD | 210-234 | 225 ± 10 (8) | 110-192 | 159 ± 28 (10) |
| SBOD | 168-228 | 211 ± 19 (8) | 60-108 | 82 ± 17 (10) |
| TKN | 27.8-31 | 29 ± 1.3 (7) | 12.8-28.9 | 22.1 ± 5.8 (10) |
| STKN | 27.8-31 | 29 ± 1.3 (7) | 12-25.5 | 17.5 ± 4.1 (10) |
| $NH_4$—N | 26.1-28.8 | 27.5 ± 1 (11) | 9.7-19.9 | 14.7 ± 4 (13) |
| $NO_3$—N | 0-1.1 | 0.56 ± 0.3 (11) | 0-0.7 | 0.3 ± 0.4 (13) |
| $NO_2$—N | 0.005-0.130 | 0.038 ± 0.038 (11) | 0-0.590 | 0.136 ± 0.204 (13) |
| Total P | 4.1-5.4 | 4.7 ± 0.3 (11) | 3.7-5.6 | 4.4 ± 0.7 (13) |
| SP ($PO_4$—P) | 4.1-5.0 | 4.6 ± 0.3 (11) | 1.5-4.2 | 2.2 ± 0.7 (13) |
| COD:TKN | — | 10.3 | — | 14.9 |
| COD:TP | — | 63.6 | — | 74.8 |
| COD:N:P | — | 100:9.7:1.6 | — | 100:6.7:1.3 |
| Alkalinity as $CaCO_3$ | 220-280 | 250 | 190-262 | 228.4 |

* numbers within parenthesis are number of samples

The system was operated within a temperature range of 20-24° C. The sludge was manually wasted from the clarifier and the aerobic bio-reactor regularly to maintain a total system solids retention time (SRT) of 10 days, 5 of which were related to the aerobic bio-reactor. Four membranes were operated at a maximum transmembrane pressure (TMP) of 9.0 psig. Once the membranes reached a TMP of 5 psig or higher, they were taken offline for chemical cleaning and another set of membranes were used to continue the experiments. Membranes were flushed with a jet of warm water and then acclimated for 5-6 hours in a 200 ppm NaOCl solution. The membrane cleaning and replacement was performed as needed about 2-3 times per week. All of the peristaltic pumps used in this system were calibrated daily.

To achieve steady state conditions, the experimental system was operated for 4 turnovers of SRT (40 days) for SWW with SWW with an average effluent COD of 3 mg/L, as compared with 94±1.7% COD removal and 84±4.2% SCOD removal for MWW, with effluent total COD of 20 mg/L. Most of the removal, up to 97±1% (SWW) and 71±4.5% (MWW), occurred in the anaerobic bio-reactor by sorption onto sludge, as will be elaborated upon later herein. As shown in FIG. 6, the increase in effluent SCOD during day 40 to 100 with the MWW (20 vs 3 mg/L) was due to non-biodegradable organics present in the MWW. The ratio of $BOD_5$ to COD in the influent SWW was 75% with average influent $BOD_5$ of 225 mg/L ranging from 210-234 mg/L. This ratio was 47% in case of MWW with $BOD_5$ ranging from 110-192 mg/L averaging at 159 mg/L. The ratio of $SBOD_5$ to SCOD in MWW was 64% with influent $SBOD_5$ ranging from 60-108 and averaging at 82 mg/L. The final effluent $BOD_5$ in both cases (i.e. SWW and MWW) was less than 2 mg/L.

TABLE 2

Summary of Effluent Parameters

| Parameter (mg/L) | Synthetic WW | | | Municipal WW | | |
|---|---|---|---|---|---|---|
| | Range | Average ± SD (n) | Average ± SD (n) (during last SRT) | Range | Average ± SD (n) | Average ± SD (n) (during last SRT) |
| TSS | 0 | 0 (11) | 0 (3) | 0 | 0 (11) | 0 (3) |
| VSS | 0 | 0 (11) | 0 (3) | 0 | 0 (11) | 0 (3) |
| COD | 0-7 | 3 ± 2.6 (11) | 6 ± 1 (3) | 11-30 | 19.6 ± 6.4 (11) | 14.3 ± 2.9 (3) |
| BOD | 0-5.3 | 1.9 ± 2 (8) | 2 ± 2.2 (3) | 0-6.6 | 2.4 ± 1.8 (10) | 1.2 ± 1.2 (3) |
| TKN | 0-2.8 | 1.1 ± 1.1 (7) | 0.37 ± 0.47 (3) | 0-1.9 | 1 ± 1.1 (10) | 0.26 ± 0.11 (3) |
| $NH_4$—N | 0-1 | 0.18 ± 0.3 (11) | 0.17 ± 0.3 (3) | 0-0.6 | 0.2 ± 0.2 (13) | 0.2 ± 0.1 (3) |
| $NO_3$—N | 5-8.8 | 7.2 ± 1.1 (11) | 6.97 ± 0.8 (3) | 3.9-7.8 | 5.7 ± 1.3 (13) | 5.8 ± 0.5 (3) |
| $NO_2$—N | 0.007-0.12 | 0.056 ± 0.04 (11) | 0.043 ± 0.041 (3) | 0.01-0.38 | 0.16 ± 0.1 (13) | 0.21 ± 0.09 (3) |
| Total P | 0-0.4 | 0.09 ± 0.1 (11) | 0 (3) | 0-0.9 | 0.2 ± 0.3 (13) | 0.13 ± 0.2 (3) |
| SP ($PO_4$—P) | 0-0.2 | 0.03 ± 0.1 (11) | 0 (3) | 0-0.45 | 0.1 ± 0.1 (13) | 0 (3) |

*numbers within parenthesis are number of samples

FIG. 7 presents the temporal variation of influent nitrogen, present as ammonia and expressed as TKN, along with effluent ammonia, nitrates and total nitrogen. The experimental system achieved final effluent $NH_4$—N concentration of less than 0.5 mg/L at a total SRT of 10 days and aerobic SRT of 5 days. FIG. 6 shows virtually no influent organic carbon into the aerobic bio-reactor; it therefore follows that nitrification was the predominant process occurring in the aerobic bio-reactor, as shown in FIG. 7, with the nitrification efficiency ranging from 90.7 to 100% averaging at 97% during SWW and MWW treatment. The ammonia uptake rate (AUR) in the aerobic bio-reactor was found to vary from 30.7-64.8 $mgNH_4$—N/gVSS.d averaging 42.9 $mgNH_4$—N/gVSS.d with SWW and 21.6-69.3 $mgNH_4$—N/gVSS.d averaging 34.1 $mgNH_4$—N/gVSS.d with MWW. Denitrification, mainly in the anoxic bio-reactor, maintained relatively low effluent $NO_3$—N concentrations of 6.9 mg/L during days 1-39 (SWW) and 5.8 mg/L during days 40-100 (MWW). The achievement of such a low nitrate concentration in the effluent is noteworthy. Bortone et al. (1996) reported that the Dephanox system achieved effluent $NH_4$—N and $NO_3$—N concentrations of 1.5 and 20.6 mg/L respectively. The effluent $NO_2$—N concentrations averaged at 0.056 mg/L with SWW and 0.16 mg/L with MWW treatment. It should be noted that the ratios of ammonium nitrogen to influent TKN in the SWW and MWW were 0.94 and 0.63 respectively. With average effluent TKN concentrations of 0.37±0.47 and 0.26±0.11 mg/L for SWW and MWW respectively, 98% TKN removal was achieved in both cases, clearly manifesting nitrification capability of the system. The % N content of the aerobic biomass was found to be 6% and 7% of VSS during SWW and MWW treatment. The biomass yield, elaborated upon later, was 0.28 and 0.26 gVSS/gCOD during SWW and MWW. Using the N content of biomass, for SWW, 5.0 mg/L of N was assimilated into biomass and 17.2 mg/L of total nitrogen was removed through SND. Thus the amount of N removed by SND is estimated at 58.1% of the total influent N concentration of 29.6 mg/L. Similarly for MWW, 6.0 mg/L of N was assimilated into biomass and 10.3 mg/L of total nitrogen was removed through SND. Thus in this case, the amount of N removed by SND is estimated at 45.6% of the total influent N concentration of 22.5 mg/L. The specific denitrification rate (SDNR) in the anoxic bio-reactor, calculated as the mass of nitrates removed divided by the VSS, was found to vary from 6.1 to 84.9 $mgNO_3$—N/gVSS.d with an average of 24.1 $mgNO_3$—N/gVSS.d with SWW and from 10.3 to 54.8 $mgNO_3$—N/gVSS.d with an average of 38.1 $mgNO_3$—N/gVSS.d for MWW.

Comparison of the influent and effluent data presented in Tables 1 and 2 indicates that P removal efficiencies averaged 99.4% and 96.3% respectively during SWW and MWW treatment. The effluent total P achieved in this system of 0.09 mg/L (SWW) and 0.2 mg/L (MWW) is superior to that reported for Dephanox (Bortone et al., 1996) of 0.5 mg/L. FIG. 8 represents soluble phosphorous (SP) profiles across the system. Comparison of the anoxic and aerobic effluent P concentrations in FIG. 8 reveals that most of the P uptake occurred in the anoxic bio-reactor. It is interesting to note that significant P release (9.5-28.0 mg/L) occurred in the anaerobic bio-reactor during SWW but low P release of about 0.2-2.8 mg/L of $PO_4$—P was observed during MWW treatment.

FIG. 9 shows measured P content (% P) of the biomass. It varied between 5.3-7.3% averaging 6.2% based on VSS during SWW and 3.5-5.8% averaging 4.6% during MWW, which reflects bio-P uptake. In light of the very low Fe and Ca concentration of 0.38 mg/L and 6.13 mg/L in SWW, the inorganic precipitation of P was discounted. Using a P content of 2% in VSS and the yield of 0.28 and 0.26 gVSS/gCOD for SWW and MWW, it is estimated that 1.7 mgP/L of the influent P was assimilated into biomass in both the cases and therefore an additional 3.0 and 2.7 mgP/L was removed by enhanced phosphorus uptake during SWW and MWW treatment. It is interesting to note that the system was operated with MWW for a period equal to 6 times the mean SRT, with the P content stabilizing at around 4.1±0.6% of VSS for the last 25 days of operation corresponding to 2.5 times the mean SRT. For DPAO's, the availability of organic substrate determines whether or not a net P uptake or P release is observed in the presence of nitrate. While P release on a mass basis with MWW was only a fraction of that with the acetate-based SWW, it is postulated that the nature and concentration of volatile fatty acids (VFAs) in the municipal wastewater was the primary factor contributing to the low release.

Detailed steady-state mass removals of SCOD, STKN, $NH_4$—N, $NO_3$—N and SP while treating MWW in the anaerobic, anoxic and aerobic bio-reactors are shown in Table 3. To delineate the effect of recycle streams, the mass flows were calculated including the recycle flows. The mass balances were performed across the system and compared with the actual removal observed during the experiments. For example, ΔSCOD across the system calculated from the sum of mass flows removed across each process unit was 9.7 g/d or 121.1 mg/L based on influent flow of 80 L/d, compared with actual ΔSCOD of 109 mg/L. Comparing the removals calculated from mass flows with the observed values, to close the mass balances, the percentage errors were 11.1, 18.8, 25.9 and 14.8% for SCOD, STKN, $NH_4$—N and SP respectively. Also, $NO_3$—N generation in the system was closed through a mass balance with percentage error of 6.7% with respect to the observed value of 5.5 $mgNO_3$—N/L. A statistical analysis of the influent and effluent mass flows for SCOD, $NO_3$—N, and SP across anaerobic, anoxic and aerobic reactors and STKN and $NH_4$—N across aerobic reactor indicated that all observed differences are significant at the 95% of confidence level.

TABLE 3

Detailed Mass Flows of each Component in the System

| Parameter (gm/d) | ΔSCOD | ΔSTKN | Δ$NH_4$—N | Δ$NO_3$—N | ΔSP |
|---|---|---|---|---|---|
| Anaerobic reactor | 5.44 | 0.04 | 0.01 | 0.18 | −0.24 |
| Anoxic reactor | 2.15 | 0.09 | −0.03 | 0.62 | 0.21 |
| Aerobic reactor | 2.10 | 0.99 | 0.88 | −1.21 | 0.18 |

From these mass balances several observations can be made. Most of the SCOD removal occurred in the anaerobic bioreactor, as reflected by a reduction of 5.44 gSCOD/d corresponding to 68 mg/L based on the influent flow rate of 80 L/d, with the anoxic and aerobic bioreactors contributing only 2.15 gSCOD/d (26.8 mg/L) and 2.1 gSCOD/d (26.3 mg/L), respectively. As expected, ammonia and STKN removal primarily occurred in the aerobic bio-reactor. STKN removal of about 1 g/d was observed in the aerobic bio-reactor with the release of 1.2 $gNO_3$—N/d, manifesting removal of both ammonia and organic nitrogen. Interestingly, about 22% of the nitrates removal (0.18 g/d of 0.8 g/d) occurred in the anaerobic bio-reactor. Soluble P removal occurred predominantly in the anoxic bio-reactor, with 0.21 g/d of SP removal of the total 0.39 g/d attributed to DPAOs. This indicates that approximately 54% of the soluble P released was removed anoxically.

SP release of 0.24 gP/d was observed in the anaerobic bio-reactor in conjunction with the nitrate reduction of 0.18 g/d. Based on the ratio of 2-4 gCOD/gP release (Kerrn-Jespersen et al., 1994, Henze et al., 1995, Kuba et al., 1994, Smolders et al., 1994, Falkentoft et al., 1999), about 0.72 gSCOD/d should be consumed for P release and an additional 1.15 gSCOD/d for denitrification in the anaerobic reactor. Hence, the total theoretical SCOD removal rate in the anaerobic reactor should be 1.87 gSCOD/d compared to the observed SCOD removal of 5.44 g/d. This clearly indicates that rest of the SCOD removal observed in the anaerobic reactor was due to sorption onto sludge.

Assuming that the denitrification of 0.62 g/d of $NO_3$—N in the anoxic reactor is carried by non-DPAO heterotrophic bacteria only, 3.97 g/d of SCOD (using the calculated COD/$NO_3$—N ratio of 6.4 for MWW, as calculated in Example 2 based on 2.86/(1-$Y_H$) with a true yield of 0.39 gVSS/gCOD or 0.55 $gCOD_{biomass}$/gCOD) would be required. However, the SCOD consumption across the anoxic reactor was only 2.15 g/d, suggesting that the remaining SCOD requirement was met from the COD sorbed onto sludge. Furthermore using the typical ratio of 7.7 gSCOD/$gNO_3$—N (Lee et al., 2003) and 9.1 gSCOD/$gNO_3$—N (Ekama and Marais, 1984), the estimated SCOD requirement for denitrification in the anoxic reactor is 4.8 and 5.6 gSCOD/d respectively, which is far greater than the observed SCOD removed in the anoxic reactor. The estimated sorbed SCOD in the anaerobic reactor of 3.6 gSCOD/d (observed removal of 5.44 gSCOD/d less the average theoretical requirement of 1.87 gSCOD/d) meets the SCOD deficit requirement in the anoxic reactor of 1.82 gSCOD/d (theoretical removal of 3.97 gSCOD/d less the actual removal of 2.15 gSCOD/d). This verifies the effectiveness of the intermediate clarifier in separating the organic-rich stream from the anaerobic mixed liquor for subsequent utilization in anoxic denitrification.

Alternatively, examining the behavior of DPAOs in the anoxic reactor reveals that there was SP uptake of 0.21 g/d. Based on SCOD required per gm P uptake for DPAOs, 8.5-10 gSCOD/gP (Kuba et al., 1994; Lee et al., 2003), this would require 1.94 gSCOD/d and hence simultaneously denitrify 0.30 $gNO_3$—N/d in the process (using 6.4 gSCOD/$gNO_3$—N for MWW). Thus, the remaining 0.32 $gNO_3$—N/d (0.30 $gNO_3$—N/d used by DPAOs out of total anoxic removal of 0.62 $gNO_3$—N/d) would be denitrified by non-PAO denitrifiers with an additional requirement of 2.05 gSCOD/d. Hence, the total SCOD requirement in the anoxic reactor would be 3.99 gSCOD/d compared to the observed anoxic SCOD removal of 2.15 g/d. The SP uptake by aerobic PAOs consumed 2.1 gSCOD/d while removing 0.18 gSP/d in the aerobic reactor. This translates to SCOD:P ratio of 11.7 which is well within the range of 7-10 gCOD per gm of P uptake (Metcalf and Eddy, 2003).

These effluent characteristics of ammonia, TKN, total nitrogen and total P of 0.2, 0.26, 6.0 and 0.13 mg/L respectively attest to the efficient SND and P removal in the present invention. It is interesting to note the high BNR efficiency achieved by this process at an extremely short HRT of 6 hours without any addition of carbon.

EXAMPLE 2

Observed system yields ($Y_{obs}$), calculated from the slopes of cumulative VSS versus cumulative COD removed plots (not shown), were 0.28 gVSS/gCOD during SWW ($R^2$=0.988) and 0.26 gVSS/gCOD during MWW ($R^2$=0.996). However, these yields are based on total VSS measured and not on the mass of active biomass. Using the VSS/TSS ratio of 0.8 during SWW and 0.73 during MWW, yield based on TSS is 0.35 gTSS/gCOD for both SWW and MWW. At the operational SRT of 10 days, true yield is estimated at 0.42 gVSS/gCOD (SWW) and 0.39 gVSS/gCOD (MWW). The true yields were calculated using the typical decay coefficient ($K_d$) of 0.05 $d^{-1}$. Table 4 presents the comparison of $Y_{obs}$ achieved in this study with other literature data. Upon comparison of the true yields ($Y_{true}$) for the various systems listed in Table 4, it is evident that the true yields of this process agrees with that of Cicek et al. (1998), which discusses performance of a membrane bioreactor system without biological nutrient removal, and is about 16% lower than all other studies.

TABLE 4

Sludge Yield: Comparison with literature data
(adapted from Innocenti et al., 2002)

| Reference | Type of WW | F/M (gCOD/gVSS.d) | $Y_{obs}$ (gVSS/gCOD) | MLVSS (g/L) | SRT (d) | Calculated* $Y_{true}$ (gVSS/gCOD) |
|---|---|---|---|---|---|---|
| Canales (1994) | Synthetic | 4.8 | 0.35 | 4.2 | — | — |
| Wen (1999) | Theoretical[a] | — | 0.38 | 2.3 | 5 | 0.48 |
|  |  | — | 0.29 | 1.8 | 15 | 0.51 |
|  |  | — | 0.26 | 6 | 15 | 0.46 |
| Huang (2001) | Domestic | — | 0.37 | 0.45-0.7 | 5 | 0.46 |
|  |  | — | 0.33 | 4.9 | 40 | 0.99 |
| Gunder (1999) | Municipal | 0.03-1[b] | 0.35-0.53[b] | 25[b] | 20-30 | 0.88-1.06 |
| Cicek (1998) | Synthetic | 0.13 | <0.15 | 10 | 30 | 0.38 |
| Krampe (2001) | Municipal | 0.034[c] | 0.57 | 12[b] | 38 | 1.65 |
| Innocenti (2002) | Domestic: 60%; Industrial: 40% | 0.21 | 0.56 | 3 | 10 | 0.84 |
| Invention | Synthetic | 0.40 | 0.28 | 2.9 | 10 | 0.42 |
|  | Municipal | 0.43 | 0.26 | 3.0 | 10 | 0.39 |

[a]The results were obtained by modeling;
[b]MLSS was used instead of MLVSS;
[c]kgBOD$_5$/kgMLSSd;
*calculated using a decay coefficient of 0.05 d$^{-1}$

EXAMPLE 3

Table 5 presents a comparison of the performance of the present invention with other bio-P processes. Although specific examples have been selected for comparison, these processes are reported on throughout the scientific and patent literature and generally achieve comparable results to those reported herein. The processes selected for comparison include A2O (You et al., 2003), Dephanox[1] (Bortone et al., 1996), Dephanox[2] (Sorm et al., 1996), Johannesburg (JHB[1]) (Bortone et al., 1996), JHB[2] (Burke et al., 1986), Phoredox (A/O) (Burke et al., 1986), Bardenpho (Burke et a., 1986), University of Cape Town (UCT) (Siebritz et al., 1983), Modified University of Cape Town (MUCT) (Siebritz et al., 1983), single stage MBR (Fan et al., 1996), and Sequencing Anoxic/anaerobic Membrane bioreactor (SAM) (Ahn et al., 2003). All of the above processes are laboratory scale except for single stage MBR, which is a pilot scale process. Most of these studies (except A2O and SAM) were operated on municipal wastewater, which is less favorable than synthetic wastewater. It is apparent that the performance of the present invention is superior to the prior art BNR processes at a much shorter HRT. Single stage MBRs are close in performance to the present invention in terms of nitrification, with effluent TKN less than 0.5 mg/L, but exhibit comparatively poor denitrification, with $NO_3$—N concentration of 43 mg/L. While from a P removal stand point processes such as JHB[2], Phoredox, Bardenpho and MUCT are more efficient than the present invention, denitrification efficiency is significantly lower with effluent nitrates in the range of 9.2 to 13.6 mg/L at comparable COD:TKN ratios. In comparison with processes that achieve similar effluent P concentrations and P removals (i.e. Dephanox and SAM), the average effluent nitrate of the present invention at 5.8 mg/L is superior to the 12-20 mg/L observed in the other systems.

One reason for the superior performance of the present invention at short HRT for combined nitrogen and phosphorous removal is the utilization of adsorbed carbon on sludge for denitrification and P uptake in the anoxic bio-reactor. Also, the membranes play a role in facilitating high biomass concentrations despite the relatively low biological yield. Furthermore, the aerobic bio-reactor serves primarily for nitrification; the use of membranes is therefore advantageous in retaining nitrifiers and prolonging their SRT, especially in light of the widely known poor settleability of nitrifiers.

REFERENCES

Ahn K-H, Song K-G, Cho E., Cho J., Yun H., Lee S. and Kim J. (2003), Enhanced biological phosphorus and nitrogen removal using a sequencing anoxic/anaerobic membrane bioreactor (SAM) process, Desalination, 157, 345-352.

American public health association (APHA), American water works association (AWWA), Water environment federation (WEF) (1998), Standard methods for the examination of water and wastewater, 20th ed.; Washington, D.C.

Bortone G., Saltarelli R., Alonso V., Sorm R., Wanner J. and Tilche A. (1996), Biological anoxic phosphorus removal—The DEPHANOX process, Water Sci. Technol., 34 (1-2), 119-128.

Burke R. A., Dold P. L. and Marais Gv. R. (1986), Biological excess phosphorus removal in short sludge age activated sludge systems, Res. Rep. W58, Dept. of Civil Eng., Univ. of Cape Town.

Canales A., Pareilleux A., Rols J. L., Goma G. and Huyard A. (1994), Decreased sludge production strategy for domestic wastewater treatment, Water Sci. Technol., 30 (8), 97-106.

Cicek N., Fanco J. P., Suidan M. T. and Vincent Urbain (1999), Effect of phosphorus on operation and characteristics of MBR, J. Environ. Eng., 125 (8), 738-746.

Cicek N., Winnen H., Suidan M. T., Wrenn B. E., Urbain V. and Manem J. (1998), Effectiveness of the membrane bioreactor in the biodegradation of high molecular weight compounds, Water Res., 32 (5), 1553-1563.

Ekama G. A. and Marais G. v. R. (1984), Biological Excess Phosphorus—Design and operation of nutrient removal activated sludge process, Water Research Commission, Pretoria, S.A.

Fan Xiao-Jun, Urbain V., Qian Yi and Manem J. (1996), Nitrification and mass balance with a membrane bioreactor for municipal wastewater treatment, Water Sci. Technol., 34 (1-2), 129-136.

Falkentoft, C. M., Harremoës, P., Mosb/Ek, H. (1999), The significance of zonation in a denitrifying, phosphorus removing biofilm, Water Res., 33 (15), 3303-3310.

Gerber A., de Villiers R. H., Mostert E. S. and van Riet C. J. (1987), The phenomenon of simultaneous phosphate uptake and release, and its importance in biological nutrient removal. In Biological Phosphate Removal from Wastewaters (Edited by Ramadori R.), Pergamon Press, Oxford.

Gerber A., Mostert E. S., Winter C. T. and de Villiers R. H. (1986), The effect of acetate and other short-chain carbon compounds on the kinetics of biological nutrient removal, Water S.A., 12, 7-12.

Güinder B. and Krauth K. (1999), Replacement of Secondary Clarification by Membrane Separation-Results with Tubular, Plate and Hollow Fiber Modules, Water Sci. Technol., 40 (4-5), 311-320.

Henze, M., Gujer, W., Mino, T., Matsuo, T., Wentzel, M. C., Marais, Gv. R. (1995), The activated sludge model no. 2, IAWQ Scientific and Technical Report No. 3., International Association on water pollution research and control, London.

Huang X., Gui P. and Qian Y. (2001), Effect of sludge retention time on microbial behavior in a submerged membrane bioreactor, Process Biochem., 36 (10), 1001-1006.

Innocenti L., Bolzonella D., Pavan P. and Cecchi F. (2002), Effect of sludge age on the performance of a membrane bioreactor: influence on nutrient and metals removal, Desalination, 146 (1-3), 467-474.

Kuba T., Smolders G. J. F., van Loosdrecht M. C. M., Heijnen J. J. (1993), Biological phosphorus removal from wastewater by anaerobic and anoxic sequencing batch reactor, Water Sci. Technol., 27, 241-252.

Lee S. H., Nam S. Y., Lim J. L., Lim K. H. and Shin H. S. (2003), Phosphorus uptake and denitrification by the denitrifying phosphorus removing bacteria under anoxic phase, 76th Water Environment Federation's Technical Exhibition and Conference, Water Environment Federation, Los Angeles, Calif. U.S.A.

Metcalf and Eddy (2003), Wastewater engineering: Treatment and reuse, 4th Edition, McGraw-Hill, New York p. 627 and p. 801.

Siebritz I. P., Ekama G. A. and Marais Gv. R. (1983), A parametric model for biological excess phosphorus removal, Water Sci. Technol., 15, 127-152.

Smolders G. J. F., Van der Meij J., Van Loosdrecht M. C. M. and Heijnen J. J. (1994), Model of the anaerobic metabolism of the biological phosphorus removal process; stoichiometry and pH influence, Biotechnol. Bioeng., 43, 461-470.

Sorm R., Bortone G., Saltarelli R, Jenicek P., Wanner J. and Tilche A. (1996), Phosphate uptake under anoxic conditions and fixed-film nitrification in nutrient removal activated sludge system, Water Res., 30 (7), 1573-1584.

Wen X., Xing C., and Qian Y. (1999), A kinetic model for the prediction of sludge formation in a membrane bioreactor, Process Biochem., 35 (3-4), 249-254.

You S. J., Hsu C. L., Chuang S. H., Ouyang C. F. (2003), Nitrification efficiency and nitrifying bacteria abundance in combined AS-RBC and A2O systems, *Water Res.,* 37 (10), 2281-2290.

TABLE 5

Performance Comparison with Other Processes

| Process | Wastewater | COD:TKN:P* (Influent) | HRT (h)* | SRT (d)* | TCOD mg/L | SCOD mg/L | $NH_4$—N mg/L | $NO_3$—N mg/L | TKN mg/L | TP mg/L | SP mg/L | ΔP mg/L |
|---|---|---|---|---|---|---|---|---|---|---|---|---|
| A2O | Synthetic | 100:13.6:1.7 | 10 | 10 | — | — | 7.5 | 4.5 | 10.5 | — | — | — |
| Dephanox[1] | Municipal | 100:19.5:2.0 | 22.9 | 10 | 26 | 13 | 1.5 | 20.6 | 5.0 | 0.9 | 0.5 | 3.5 |
| Dephanox[2] | Municipal | 100:19.5:3.0 | 23 | 10 | 34 | 20 | 1.2 | 11.6 | 6.0 | 0.6 | 0.36 | 5.8 |
| JHB[1] | Municipal | 100:24.5:1.9 | 17.8 | 20 | 30 | 11 | 0.5 | 17.4 | 4.0 | 2.7 | 1.7 | 1.8 |
| JHB[2] | Municipal | 100:8.3:4.5 | 8.5 | 5 | 61 | — | — | 13.6 | 9.0 | 9.7 | — | 13.0 |
| Phoredox | Municipal | 100:9.1:4.9 | 6.4 | 3 | 62 | — | — | 9.2 | 19.0 | 17.9 | — | 9.9 |
| Bardenpho | Municipal | 100:10.3:5.2 | 7.7 | 6 | 40 | — | — | 13.4 | 3.0 | 18 | — | 7.7 |
| UCT | Municipal | 100:10.7:2.4 | 17.5 | 20 | 29 | — | — | 9.6 | 4.0 | 5.9 | — | 5.9 |
| MUCT | Municipal | 100:9.4:2.3 | 17.5 | 20 | 35 | — | — | 9.3 | 4.8 | 2.8 | — | 8.7 |
| Single stage MBRs | Municipal | 100:12.9:0 | 7.5 | 20 | 17 | — | <0.3 | 43 | <0.5 | — | — | — |
| SAM | Synthetic + Municipal | 100:15.4:1.5 | 8 | 70 | 10 | — | — | ~15[#] | — | 0.26 | — | 3.4 |
| Invention | Synthetic | 100:9.7:1.6 | 6 | 10 | 3 | 3 | 0.18 | 7.2 | 0.37 | 0.09 | 0.03 | 4.6 |
| | Municipal | 100:6.7:1.3 | 6 | 10 | 14 | 14 | 1.2 | 5.7 | 0.26 | 0.13 | 0.1 | 4.3 |

Exceptions:
*represents operating conditions;
represents total nitrogen.

Kerrn-Jespersen J. P., Henze M., Strube R. (1994), Biological phosphorus release and uptake under alternating anaerobic and anoxic conditions in a fixed-film reactor, Water Res., 28, 1253-1255.

Krampe J. and Krauth K. (2001), Sequencing batch reactor with submerged hollow fiber membranes for the biomass separation, Water Sci. Technol., 43 (3), 195-199.

Kuba T., Wachtmeister A., van Loosdrecht M. C. M., Heijnen J. J. (1994), Effect of nitrate on phosphorus release in biological phosphorus removal systems, Water Sci. Technol., 30 (6), 263-269.

The invention claimed is:

1. A wastewater treatment process comprising:

providing a wastewater to an anaerobic bio-reactor;

removing soluble organic carbon from the wastewater in the anaerobic bio-reactor;

providing an anaerobic bio-reactor effluent to a clarifier;

separating a clarifier sludge comprising insoluble organic carbon from the anaerobic bio-reactor effluent in the clarifier and creating a clarifier supernatant comprising ammonia;

treating the clarifier sludge in an anoxic bio-reactor, generating a phosphorus-rich anoxic biomass and an anoxic bio-reactor effluent comprising ammonia; and, directing the clarifier supernatant for further treatment that bypasses the anoxic bio-reactor.

2. The process according to claim 1, wherein:

the process further comprises:

recycling the anoxic biomass to the anaerobic bio-reactor.

3. The process according to claim 1, wherein:

the further treatment of the clarifier supernatant comprises:

nitrifying the ammonia from the clarifier supernatant in a suspended growth aerobic bio-reactor.

4. The process according to claim 3, wherein the further treatment of the clarifier supernatant comprises:

generating an aerobic biomass in the aerobic bio-reactor; and, recycling the aerobic biomass to the anoxic bio-reactor.

5. The process according to claim 4, wherein the further treatment of the clarifier supernatant comprises:

generating an anoxic bio-reactor effluent comprising residual nitrogen; and, treating the residual nitrogen from the anoxic bio-reactor effluent in the aerobic bio-reactor.

6. The process according to claim 5, wherein the process further comprises:

generating an aerobic bio-reactor effluent in the aerobic bio-reactor; and, filtering the aerobic bio-reactor effluent using a filter means.

7. The process according to claim 6, wherein the filter means comprises a membrane filter.

8. The process according to claim 6, wherein the filter means is located within the aerobic bio-reactor.

9. The process according to claim 1, wherein the clarifier sludge further comprises an anaerobic biomass rich in sorbed organic carbon.

10. The process according to claim 1, wherein the step of treating the clarifier sludge in the anoxic bio-reactor is achieved by a microbial population comprising de-nitrifying phosphorous accumulating organisms (DPAO's).

11. The process of claim 1, further comprising the step of:

directing the anoxic bio-reactor effluent to further aerobic treatment while recycling the anoxic bio-mass to the anaerobic bio-reactor.

12. A method of treating wastewater comprising:

anaerobically treating the wastewater to remove soluble organic carbon therefrom to produce an anaerobically treated effluent;

separating a sludge comprising insoluble organic carbon from a liquid fraction of the anaerobically treated effluent;

anoxically treating the sludge separately from the liquid fraction, generating a phosphorus-rich anoxic biomass; and recycling the anoxic biomass for anaerobic co-treatment with the wastewater.

13. The method according to claim 12, wherein the anoxic treatment of the sludge is performed by a microbial population comprising de-nitrifying phosphorous accumulating organisms (DPAO's).

14. A process for treating a wastewater containing nitrogen and phosphorus compounds, comprising the steps of:

treating the wastewater in an anaerobic bio-reactor to react soluble organic compounds in the wastewater, generating an anaerobic bio-reactor effluent;

separating the anaerobic bio-reactor effluent into a clarifier sludge comprising insoluble organic carbon compounds and a clarifier supernatant comprising ammonia;

treating the clarifier sludge in an anoxic bio-reactor; and, diverting the clarifier supernatant into a treatment step downstream of the anoxic bio-reactor.

15. A method of treating wastewater comprising:

anaerobically treating the wastewater to remove soluble organic carbon therefrom to produce an anaerobically treated effluent;

separating the anaerobically treated effluent into a sludge comprising insoluble organic carbon and a liquid fraction comprising ammonia;

aerobically treating the liquid fraction to produce an aerobic biomass and an aerobically-treated effluent;

separating the aerobically treated effluent from the aerobic biomass; and anoxically co-treating the sludge and the aerobic biomass, generating a phosphorus-rich anoxic biomass.

16. The method according to claim 15, wherein the aerobic treatment produces an aerobic treatment effluent and wherein the method further comprises filtering the aerobic treatment effluent using a filter means.

17. The method according to claim 16, wherein the filter means comprises a membrane filter.

18. A method of treating wastewater comprising:

anaerobically treating the wastewater to remove soluble organic carbon therefrom to produce an anaerobically treated effluent;

separating the anaerobically treated effluent into a sludge comprising insoluble organic carbon and a liquid fraction comprising ammonia;

anoxically treating the separated sludge, generating a phosphorus-rich anoxic biomass and an anoxic treatment effluent; and aerobically co-treating the anoxic treatment effluent with the liquid fraction.

* * * * *